(No Model.)
J. V. BOHANNAN.
MEAT SLICER.
No. 481,159. Patented Aug. 23, 1892.
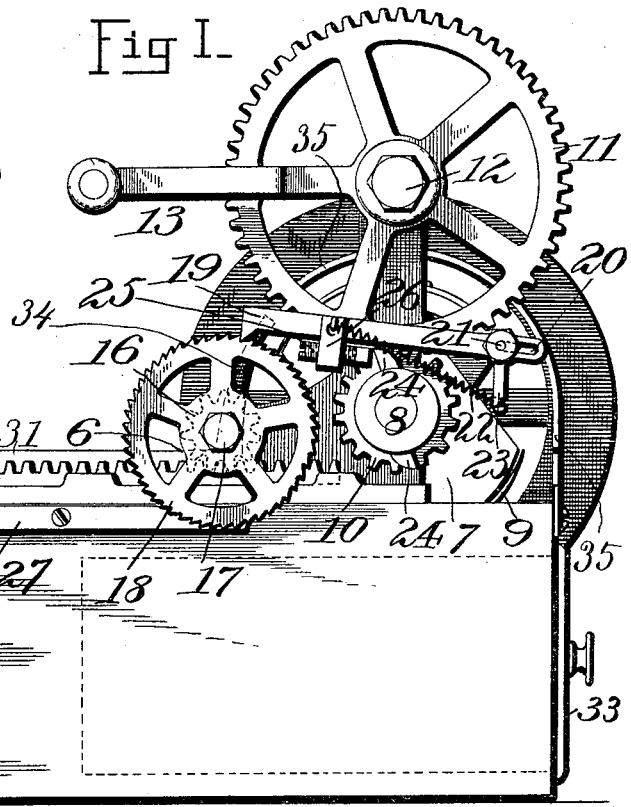
Fig I.
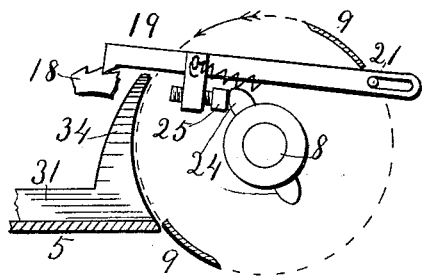
Fig III.
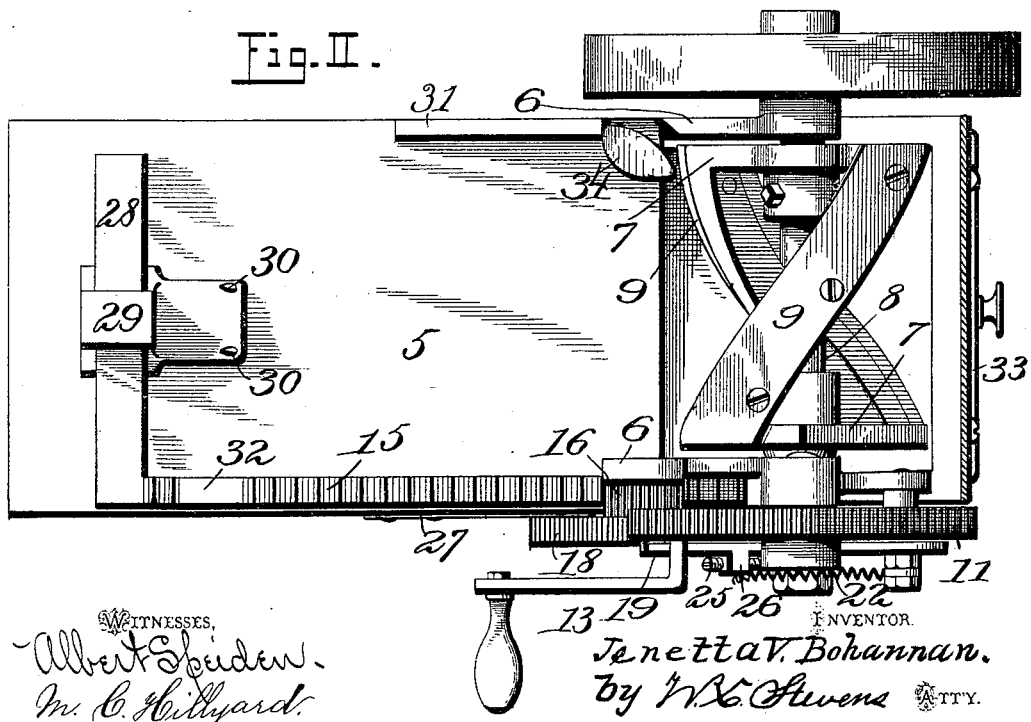
Fig. II.
Witnesses.
Albert Speiden.
M. C. Hillyard.
Inventor.
Jenetta V. Bohannan.
by W. X. Stevens Atty.

UNITED STATES PATENT OFFICE.

JENETTA V. BOHANNAN, OF BALTIMORE, MARYLAND.

MEAT-SLICER.

SPECIFICATION forming part of Letters Patent No. 481,159, dated August 23, 1892.

Application filed November 13, 1891. Serial No. 411,807. (No model.)

*To all whom it may concern:*

Be it known that I, JENETTA V. BOHANNAN, a citizen of the United States, residing at Baltimore, Maryland, have invented certain new and useful Improvements in Meat-Slicers; and I do hereby declare the following to be a full, clear, and exact description of the invention, such as will enable others skilled in the art to which it appertains to make and use the same.

This invention relates to that class of machines which are used for cutting meat, vegetables, bread, &c., into thin slices; and its object is to provide, first, means for producing a shearing cut across the whole face of the meat or other substance in lump form and for steadily resisting the wedging action of the blades, which tends to twist the lump around on the table; second, means for producing an automatic intermittent feed motion to bring the meat forward into the path of the blades without bearing against the blades to impede their motion; third, means for regulating the feed to cut slices thick or thin, and, fourth, means to guard the machine against being broken or in any way injured, even if the knives be revolved after the feed-carriage has traveled to its forward limit.

To this end my invention consists in the construction and combination of parts forming a "meat-slicing machine," hereinafter described and claimed, reference being had to the accompanying drawings, in which—

Figure I is a side elevation of a meat-slicer according to my invention. Fig. II is a top view of the same with the housing for the knife-cylinder removed. Fig. III is a side view, partly in section, of certain parts separated from the rest of the machine for the purpose of showing their relative working positions.

The frame of the machine comprises a bed-plate 5, serving as the table upon which the meat or other substance to be sliced is placed, and side brackets 6, which serve as bearings for the rotary parts.

7 represents cutter-heads mounted on a shaft 8, which is journaled to revolve in the frame.

9 represents cutter-blades fixed at their ends upon the said heads and shaped each like a spiral stave with one edge sharpened.

10 is a pinion-wheel fixed upon the shaft 8, engaged by a spur-wheel 11, that is fixed upon a shaft 12, journaled in the frame and provided with a hand-crank 13.

15 is a rack fitted to slide upon one edge of the table 5, and 16 is a pinion engaging the rack and fixed upon a shaft 17, which is journaled in the frame, and the pinion is provided with a ratchet-wheel 18.

19 is a pawl adapted to engage the said ratchet-wheel, and it is slotted at 20 to slide longitudinally upon a stud 21, fixed in the frame.

22 is a spring acting between the pawl and a fixture 23 of the frame, and its line of impulse is oblique to the line of the pawl for the double purpose of drawing the pawl to its rearward limit and down into engagement with the ratchet-wheel 18.

24 represents wipers either fixed to the pinion 10 or having a hub of their own fixed upon the shaft 8, and 25 is a screw threaded through a lug 26, projecting from the pawl 19 in the path of the said wipers, whereby the pawl is driven forward at each revolution of the cutter-shaft 8, this screw serving as a tappet for the wipers to act against. This tappet is adjustable along the pawl by turning the screw 25 through the lug 26, so that the pawl may be set to be driven forward by each tappet a distance corresponding to one or more teeth of the ratchet-wheel 18.

27 is a spring fixed to the side of the table with its free end bearing with frictional tension against the face of the ratchet-wheel to serve as a yielding detent therefor.

28 is an arm fixed to the rack 15 and extending across the table.

29 is a head-block fitted to slide freely across the table upon the arm 28 and provided with upward-projecting spurs 30, upon which a piece of meat, a loaf of bread, or a vegetable may be impaled.

31 is a side guide of the frame, projecting above the table at that side thereof to which the spiral form of the blades tends to wedge the meat in the act of making a shearing cut. This side guide is provided with a horn 34, rising with a slant both inward and toward the cutters, in the form of a segmental arc parallel with the cylinder of revolution of the cutters and so near thereto as to serve as an opposite blunt blade to hold the meat against the sidewise wedging action of the spiral edges of the cutter-blades. The inward slant, as shown in Fig. II, is for the purpose of wedging the meat close down upon the table, this horn being located at the base of the wedge-shaped opening formed by a blade and the table. The rack 15, with its cross-bar 28 and head-block 29, constitute the meat-carriage.

32 is a space at the end of the rack where the teeth are left out, so that the pinion can have nothing to act upon after it has drawn the carriage to its forward limit, thus preventing the head-block from being carelessly drawn into the path of the knives and destroying them.

33 is a drawer, which may be arranged in a box beneath the table 5 to receive the chippings; but this is not necessary to my invention, because the machine may be secured upon any bench and any receptacle may be set beneath for the chippings.

The operation is as follows: Place the waste end of the piece of meat over the spurs 30 and force it thereon until the piece rests on the table. Now, to save time, raise the pawl 19 and push the carriage forward by hand until the meat comes against the face of a knife, and then, by means of the crank, revolve the knives, and slices will be thereby cut from the meat and dropped below, the usual housing 35 preventing parts of the meat from being scattered. This operation may be continued until all the meat of any value is sliced, or until the space 32 reaches the pinion, when further revolving of the crank will effect nothing. Now the pawl 19 may be held out of engagement with the ratchet-wheel 18 while the carriage is drawn quickly back by hand. The side guide 31 is low and narrow along the edge of the bed, so that lumpy projections on the side of the meat may pass over it and permit the front end of the meat to bear against the horn 34 while being cut. Furthermore, the head-block 29, being left free to slide upon the cross-bar 28, readily adjusts itself to the shifting line of the meat's travel and holds the front end of the meat constantly parallel to the knives. The detent-spring 27 holds the ratchet-wheel 18 sufficiently firm to keep meat, bread, or vegetables up to the knives; but if a skewer or a slanting bone were in the meat the knives striking it would wedge it backward repeatedly, and the pawl would continually act upon the same tooth and produce no further effect, because the carriage is pushed to follow the pawl back at each retreating movement, the blades acting at the instant the pawl retreats, and the machine may be stopped before the knives strike many blows on such an obstacle. Of course the crank is a necessity only when the machine is made to be run by hand, and power may be applied in any usual manner.

Having thus fully described my invention, what I believe to be new, and desire to secure by Letters Patent, is the following:

1. The combination, in meat-slicers, of one or more blades set spirally upon heads fixed to a rotary shaft and a table located with its forward end close to the cylinder of rotation of the knives and having a narrow guide rising from that side at its front end which is the base of a wedge formed between one of the said spiral knives and the table, substantially as described.

2. The combination of a table having a narrow guide standing at one side of the forward edge, one or more knives fixed spirally upon heads journaled to revolve across the said forward end of the table, and an automatically-propelled meat-carriage upon the table having a transverse arm and a spur-armed head-block fitted to slide freely upon the said arm, substantially as described, whereby meat upon the said head-block will be held from twisting on the table and yet be free to adjust itself transversely for its side irregularities to follow the said guide.

3. The combination, in meat-slicers, of a shaft provided with cutting-blades and fitted to revolve in bearings, and further provided with a number of wipers corresponding to the number of blades, a table and a meat-carriage thereon, the carriage being provided with a feed-rack, a pinion journaled upon the frame to engage the said rack and provided with a ratchet-wheel, a pawl slotted and thereby mounted upon a stud of the frame and adapted to engage the ratchet-wheel, a tappet upon the pawl in the path of the said wipers, and a spring connecting the pawl with a fixture of the frame to act with an impulse oblique to the line of the pawl, the wipers bearing such relation to the knives as to advance the meat between the knives and not against their faces.

4. The combination, in meat-slicers, of a table, a shaft provided with spiral knives at the end of the table and with a series of wipers corresponding to the knives in number, a carriage fitted to slide upon the table and provided with a feed-rack, a pinion-wheel to engage the rack and provided with a ratchet-wheel, a pawl to engage the ratchet-wheel and mounted for longitudinal motion upon the frame, a tappet longitudinally adjustable on the pawl in the path of the said wipers, and a spring for retracting the pawl, substantially as described.

5. The combination of a table, a meat-carriage mounted to slide thereon and provided with a feed-rack, a pinion to engage the said rack, knives mounted upon a shaft at the end of the table, and mechanism communicating feed motion between the said shaft and pinion, a space being left at the end of the said rack in which the pinion revolves freely when the carriage reaches the forward end of its path, substantially as described.

6. The combination, in meat-slicers, of a table, a carriage thereon, a ratchet and pinion for feeding the carriage, a pawl to propel the ratchet, and a frictional detent acting against the ratchet, substantially as described.

7. The combination, in meat-slicers, of a table, a cutter-blade hung to move past the end of the table with its edge carried at an angle to the plane thereof, and a horn fixed to the table at the base of a wedge formed by the angle of the blade and table and curved in the form of a segmental arc nearly parallel with the cylinder of revolution of the blade and slanted inward, substantially as described.

In testimony whereof I affix my signature in presence of two witnesses.

JENETTA V. BOHANNAN.

Witnesses:
  W. X. STEVENS,
  M. C. HILLYARD.